(12) United States Patent
Anhut et al.

(10) Patent No.: US 11,703,670 B2
(45) Date of Patent: Jul. 18, 2023

(54) OPTICAL ASSEMBLY FOR SCANNING EXCITATION RADIATION AND/OR MANIPULATION RADIATION IN A LASER SCANNING MICROSCOPE, AND LASER SCANNING MICROSCOPE

(71) Applicant: Carl Zeiss Microscopy GmbH, Jena (DE)

(72) Inventors: Tiemo Anhut, Jena (DE); Matthias Wald, Jena (DE); Daniel Schwedt, Jena (DE); Tobias Kaufhold, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 575 days.

(21) Appl. No.: 16/641,516

(22) PCT Filed: Aug. 23, 2018

(86) PCT No.: PCT/EP2018/072805
§ 371 (c)(1),
(2) Date: Feb. 24, 2020

(87) PCT Pub. No.: WO2019/038398
PCT Pub. Date: Feb. 28, 2019

(65) Prior Publication Data
US 2021/0157117 A1 May 27, 2021

(30) Foreign Application Priority Data
Aug. 25, 2017 (DE) .......................... 102017119478.9

(51) Int. Cl.
*G02B 21/00* (2006.01)
*G02B 26/10* (2006.01)
*G02B 27/28* (2006.01)

(52) U.S. Cl.
CPC ....... *G02B 21/0048* (2013.01); *G02B 21/006* (2013.01); *G02B 21/0076* (2013.01); *G02B 26/105* (2013.01); *G02B 27/283* (2013.01)

(58) Field of Classification Search
None
See application file for complete search history.

(56) References Cited

U.S. PATENT DOCUMENTS

| 5,691,839 A | 11/1997 | Kobayashi |
| 7,715,078 B2 | 5/2010 | Okugawa |

(Continued)

FOREIGN PATENT DOCUMENTS

| DE | 10 2014 017 001 A1 | 5/2016 |
| DE | 10 2014 017 002 A1 | 5/2016 |

(Continued)

OTHER PUBLICATIONS

Chinese Office Action for Chinese Patent Application No. 201880055289.3 dated Aug. 30, 2021, 7 pages.

(Continued)

*Primary Examiner* — Derek S. Chapel
(74) *Attorney, Agent, or Firm* — Duane Morris LLP

(57) ABSTRACT

An optical assembly in a laser scanning microscope, having an optical scanning unit providing a first pupil plane, a first beam deflecting device, made of a first scanner arranged on the first pupil plane, for scanning excitation radiation in a first coordinate direction, a first focusing device generating a second pupil plane, optically conjugated to the first pupil plane, and a second beam deflecting device for deflecting the excitation radiation. The second deflecting device is arranged on the second pupil plane. A second focusing device to generate a third pupil plane, is optically conjugated to the first pupil plane and the second pupil plane. A third beam deflecting device is arranged on the third pupil plane, (Continued)

and a variable beam deflecting device is provided to switch an optical beam path between a first beam path and a second beam path.

24 Claims, 5 Drawing Sheets

(56) References Cited

U.S. PATENT DOCUMENTS

| | | | | |
|---|---|---|---|---|
| 11,525,989 | B2* | 12/2022 | Anhut | G02B 26/101 |
| 2006/0012864 | A1* | 1/2006 | Funk | G02B 21/002 |
| | | | | 359/385 |
| 2016/0131881 | A1* | 5/2016 | Boehme | G02B 21/006 |
| | | | | 359/385 |
| 2020/0183139 | A1* | 6/2020 | Anhut | G02B 27/283 |

FOREIGN PATENT DOCUMENTS

| | | |
|---|---|---|
| DE | 100 50 529 B4 | 6/2016 |
| DE | 10 2016 102 286 A1 | 8/2017 |
| EP | 1 970 744 A1 | 9/2008 |
| EP | 2 042 905 A1 | 4/2009 |
| EP | 2 042 905 B1 | 4/2016 |
| WO | 2015/158861 A1 | 10/2015 |

OTHER PUBLICATIONS

Translation of Chinese Office Action for Chinese Patent Application No. 201880055289.3 dated Aug. 30, 2021, 10 pages.

German Search Report for DE 10 2017 119 478.9 dated Jun. 20, 2018, 5 pages.

Notification of Transmittal of Translation of International Preliminary Report on Patentability and Translation of International Preliminary Report on Patentability dated Mar. 5, 2020, 7 pages.

Dean, Kevin M., et al.; "Deconvolution-free Subcellular Imaging with Axially Swept Light Sheet Microscopy"; Biophysical Journal 2015; 108(12):2807-2815.

Archer-Zhang, Christian Chunzi, et al.; "Dynamic performance of microelectromechanical systems deformable mirrors for use in an active/adaptive two-photon microscope"; Journal of Biomedical Optics 2016; 21(12):121507-1-121507-10.

* cited by examiner

OPTICAL ASSEMBLY FOR SCANNING EXCITATION RADIATION AND/OR MANIPULATION RADIATION IN A LASER SCANNING MICROSCOPE, AND LASER SCANNING MICROSCOPE

RELATED APPLICATIONS

The present application is a U.S. National Stage application of International PCT Application No. PCT/EP2018/072805 filed on Aug. 23, 2018 which claims priority benefit of German Application No. DE 10 2017 119 478.9 filed on Aug. 25, 2017, the contents of each are incorporated by reference in their entirety.

FIELD OF THE INVENTION

The present invention relates, in a first aspect, to an optical arrangement for scanning excitation radiation and/or manipulation radiation in a laser scanning microscope in accordance with the preamble of the first claim directed to an optical arrangement. In a further aspect, the invention relates to a laser scanning microscope in accordance with the preamble of the first claim directed to a laser scanning microscope.

BACKGROUND OF THE INVENTION

A generic optical arrangement for scanning excitation radiation and/or manipulation radiation in a laser scanning microscope is described, for example, in DE 10 2014 017 001 A1 and has the following components: a scanning optical unit for providing a first pupil plane, a first beam-deflecting device that is formed by a first scanner arranged in the first pupil plane for scanning the excitation radiation and/or manipulation radiation in a first coordinate direction, a first focusing device for producing a second pupil plane that is optically conjugate to the first pupil plane, and a second beam-deflecting device for deflecting the excitation radiation and/or manipulation radiation, which is arranged in the second pupil plane.

A generic laser scanning microscope is also disclosed in DE 10 2014 017 001 A1 and has the following components: at least one laser light source for emitting laser radiation for exciting and/or manipulating a specimen, at least one main colour splitter for separating excitation radiation and/or manipulation radiation, on the one hand, and wavelength-shifted detection light emanating from a specimen, on the other, and at least one microscope objective for guiding excitation radiation and/or manipulation radiation onto a specimen and for guiding detection light emanating from the specimen back in the direction of the main colour splitter, and a detection module for detecting the detection light.

Laser scanning microscopy has established itself as an indispensable tool in biomedical research. In addition to pure imaging, the optical manipulation of specimens increasingly gains importance.

A general technical problem here is that of producing, with the lowest possible outlay and in as compact an installation space and with as low a transmission loss as possible, a plurality of optical pupils that are respectively imaged onto one another. The number of the useful pupils should here be greater than or equal to three. It should be possible to switch between at least two of the available pupils.

Known solutions are based firstly on the use of different ports on the stand. This is disadvantageous because as a result, the microscope stand becomes complicated and expensive. It is furthermore not possible under certain circumstances to undertake further methods, such as high-resolution microscopy, using the same stand. In addition, complicated adjustments frequently need to be performed to make the respective image fields coincide with one another.

Known solutions for the manipulation using only one scanning objective are generally mechanical and, as a result, frequently relatively slow. It is generally hardly possible to switch larger masses, like e.g. mirrors, at rates faster than 10 ms. Relatively short switching times can be attained using galvanometric scanners. However, the moment of inertia must be kept low in this case, if possible.

Document U.S. Pat. No. 7,715,078 discloses switching between a plurality of scanners. However, it is not possible here to accommodate a z-scanning mirror in a fourth pupil. Yet said mirror is required in particular for three-dimensional optical manipulation.

EP 2 042 905 B1 discloses a combination of two scanner pairs. It is possible here to select in each case one scanner pair or the other. However, it is not possible to very quickly switch in individual axes because the masses to be moved are comparatively large.

SUMMARY OF THE INVENTION

An object of the present invention is considered to be the provision of an optical arrangement with which further pupil planes are made available, wherein only little additional installation space is required. In addition, it should be possible to switch as quickly as possible between the pupil planes. Finally, a laser scanning microscope having additional pupil planes in which it is possible to switch between the different pupil planes as quickly as possible is to be provided.

This object is achieved by way of the optical arrangement having the features set forth in the appended claims. With respect to the microscope, the object is achieved by way of the laser scanning microscope having the features of the appended claims.

Advantageous variants of the optical arrangement according to the invention and of the laser scanning microscope according to the invention are the subject matter of the dependent claims and are also described below, in connection with the figures.

The optical arrangement of the above-stated type is designed further in accordance with the invention in that a second focusing device is present for producing a third pupil plane, which is optically conjugate to the first pupil plane and the second pupil plane, in that a third beam-deflecting device is arranged in the third pupil plane for deflecting the excitation radiation and/or manipulation radiation, in that a variable beam-deflecting means is provided between the first focusing device and the second pupil plane, on the one hand, and the second pupil plane and the second focusing device, on the other, for deflecting an optical beam path between a first beam pathway and a second beam pathway.

The laser scanning microscope of the abovementioned type is designed further in accordance with the invention in that an optical arrangement according to the invention for scanning excitation radiation and/or manipulation radiation is present.

An optical arrangement in the context of the present description is understood to mean an arrangement that has beam-shaping components, such as lenses and concave mirrors, and beam-deflecting components, such as mirrors, which are movable.

The term scanning is understood to mean the controlled guidance of a beam of the excitation radiation or the manipulation radiation over a specimen. This scanning can be performed in the form of a regular pattern, for example in lines, but in particular also along a specifiable trajectory.

Excitation radiation for the purpose of this description is understood to mean electromagnetic radiation, such as visible light, but also infrared and ultraviolet radiation, as is generally used for imaging. Mostly, this excitation radiation is provided by lasers. Different contrasting methods can be used here. With particular preference, the radiation is radiation for exciting fluorescence from dyes, with which a specimen to be investigated is prepared. A laser scanning fluorescence microscope is used to measure said fluorescent light. In addition, it may alternatively also be illumination light for light microscopy.

The term detection light is understood to mean light that is emitted by the specimen as a response to the excitation and that is intended to be detected using the entire optical arrangement. Detection light can be fluorescent light.

Manipulation radiation is understood to mean electromagnetic radiation, such as in the visible range, but also in the infrared and ultraviolet range, with which a targeted change can be made possible in a specimen under examination, in particular within a spatial region that is selected in a targeted fashion or a trajectory that is specifiable and selected in a targeted fashion.

The terms excitation radiation and excitation light, on the one hand, and manipulation radiation and manipulation light, on the other, are used synonymously in this description.

A pupil plane for the purposes of this description is understood to mean an optical plane that, in an operating state of the optical arrangement in a laser scanning microscope, is optically conjugate to a rear objective pupil of the respectively used microscope objective. By way of example, in an operating state of the arrangement according to the invention for scanning, the first, the second, the third and the fourth pupil planes are optically conjugate to the rear pupil of the microscope objective. Since the position of the rear objective pupil varies, the pupil planes are generally exactly optically conjugate to the rear objective pupil only for one objective. For the other objectives, the pupil planes are approximately optically conjugate to the rear objective pupil.

In principle, the arrangement according to the invention can be used to produce an arbitrary number of pupils. However, important applications already benefit from four pupils which are imaged onto one another with manageable adjustment effort and low optical losses.

The scanning optical unit generally consists of an arrangement of lenses, by way of which a first pupil plane that is equivalent to the rear objective pupil is generated.

Scanners, such as first, second and third scanners, within the context of the present description are understood to mean devices with which the direction of a beam can be changed in at least one coordinate direction. Pivotable mirrors are used with particular preference as scanners.

Where coordinate directions are mentioned within the context of the present description, reference is made, in particular, to Cartesian coordinates. For example, the first coordinate direction can be the y-direction and the second coordinate direction can be the x-direction. A coordinate system is frequently selected such that the optical axis of a system coincides with the z-axis.

Any focusing components, including, such as, lenses or compound lenses, can in principle be used as the first and second focusing devices for generating a pupil plane. With particular preference, concave mirrors, such as, spherical or toric concave mirrors, are used as the first and/or second focusing device.

It can be particularly advantageous in this case if the optical path via the first concave mirror is designed such that a magnification ($|V|>1$) or a diminishment ($|V|<1$) is achieved. This is advantageous if different scanners are to be combined with one another. For example, it is known for resonant MEMS scanners to be able to have only specific diameters if resonant frequency and dynamic mirror deformation are specified. However, there is an optimum size for quasi-static galvanometer scanners that does not coincide with the size of the resonant MEMS scanner. For optimum optical combination of both scanner systems, adaptation of the pupil diameters via a magnification stage can be highly useful. Within specific limits, deviations from 1:1 imaging can be tolerated, as a result of which scanners of different sizes can optionally be located in the respective positions.

For the second and the third beam-deflecting device, what is important is that the radiation is deflected in a defined fashion. Particularly preferred variants are characterized in that the second beam-deflecting device in the second pupil plane is a second scanner for scanning the excitation radiation and/or the manipulation radiation, in a second coordinate direction that differs from the first coordinate direction, and/or in that the third beam-deflecting device in the third pupil plane is a third scanner for scanning the excitation radiation and/or the manipulation radiation, in a second coordinate direction that differs from the first coordinate direction.

The optical arrangement according to the invention is distinguished by way of great flexibility. For example, the second beam-deflecting device and/or the third beam-deflecting device can also be a fixed mirror, a mirror having an actively curvable surface, or a further wavefront-changing element. For example, a wavefront-changing element can be used to change the focusing along the optical axis, for example in the z-direction, and a z-scan can be performed within this meaning.

The term variable beam-deflecting means refers to a component that permits any type of adjustment or setting, and therefore deflects incident light or incident radiation differently depending on said adjustment or setting. This refers in particular to variably settable mirrors.

Switching an optical beam path between a first beam pathway and a second beam pathway is understood to mean that, depending on the switching state, the light or the radiation travels either along the first beam pathway or along the second beam pathway. The first and the second beam pathway differ in this case, which means there are parts of the first beam pathway that are not part of the second beam pathway, and vice versa.

The first beam pathway can preferably extend at least from the third beam-deflecting device via the second beam-deflecting device to the first scanner. The second beam pathway can preferably extend at least from the third beam-deflecting device to the first scanner while bypassing the second beam-deflecting device via the variable beam-deflecting means.

In a particularly preferred variant of the arrangement according to the invention, the first beam pathway extends at least from the third beam-deflecting device via the second focusing device, the second beam-deflecting device and the first focusing device to the first scanner. The second beam pathway can additionally preferably extend at least from the third beam-deflecting device to the first scanner via the second focusing device while bypassing the second beam-deflecting device via the variable beam-deflecting means and the first focusing device.

The feature that the second scanner is bypassed in the case of the second beam pathway is intended to mean that excitation and/or manipulation radiation which takes the second beam pathway does not come into contact with the second scanner. Any possible movement of this second scanner accordingly has no influence on the excitation and/or manipulation radiation.

The present invention is suitable for confocal laser scanning fluorescence microscopy. A microscope objective is used here both for guiding excitation radiation and/or manipulation radiation onto a specimen or into a region of a specimen, and for guiding detection light which emanates from the region of the specimen which has been illuminated with excitation radiation and/or manipulation radiation.

The term detection module in the context of the present description refers to that component with which the detection light emitted by an illuminated specimen is ultimately detected. Such a detection module has at least one radiation detector and can, depending on the use, have colour filters and confocal stops.

A crucial concept of the present invention can be considered that of providing a further pupil plane, in which a further scanner can be arranged, using suitable focusing means, such as a concave mirror. A further fundamental concept of a variant of the invention is that of guiding, using a variable beam-deflecting means, the beam of the excitation radiation and/or manipulation radiation either via a first beam pathway that contains a first scanner (in the nomenclature of the claims the second scanner) for a specific coordinate direction, or via a second beam pathway that contains a second scanner (in the nomenclature of the claims the third scanner) for said coordinate direction. Particular advantages can be achieved if said first scanner for the specific coordinate direction and the second scanner for said coordinate direction are qualitatively different, if in particular the first scanner is a quasi-static scanner and the second scanner is a resonance scanner. It is thus possible, using the variable beam-deflecting means, to switch between the fast and the slow scanner. Since such switching of the beam pathway can in principle be realized particularly quickly (in the order of magnitude of 1 ms and less), it is also possible to very quickly switch between the two beam pathways and thus between an imaging mode and a manipulation mode.

The arrangement according to the invention is very powerful and can be used to solve different problems.

The optical arrangement according to the invention is suitable for use in a confocal laser scanning fluorescence microscope. Therefore, the laser scanning microscope according to the invention can with particular preference be a confocal, laser scanning fluorescence microscope.

The optical arrangement according to the invention and the laser scanning microscope according to the invention can preferably be used for manipulation of biological specimens, in particular in three dimensions. However, applications in material microscopy are also conceivable.

The arrangement according to the invention is also usable for optical manipulation, laser scanning microscopy, lightsheet microscopy and for other methods in which a specimen is raster-scanned by a laser beam.

A significant advantage of the present invention is that it becomes possible in a laser scanning microscope to perform not only imaging or optical manipulation using a quasi-static scanner, but also quick imaging using a resonant scanner.

A quasi-static scanner refers to a scanner that is operated not in resonant fashion but, comparatively slowly, quasi-statically. It is in particular possible to impress a drive characteristic onto a quasi-static scanner. Said curve can be for example linearized, such that each pixel can be assigned the same residence time. Resonant scanners only permit sinusoidal movements, which can be significantly more high frequency, however. A resonant scanner, or resonance scanner, is operated in mechanical resonance, generally comparatively much faster than a quasi-static scanner. Both the quasi-static and the resonantly operated scanner can be realized by a galvanometric scanner or a MEMS scanner.

In principle, it is also possible for acousto-optic devices, such as acousto-optic scanners, to be used as the beam-deflecting device as the scanners.

The invention permits very fast switching between a manipulation mode and imaging. Very fast here means that the switch can be effected more quickly than approximately 1 millisecond (ms). In addition, three-dimensional optical manipulation, for example targeted spatial bleaching (keywords: FRAP; uncaging) or optogenetic switching of ion channels etc. and subsequent switching to possibly very fast imaging is also possible. For three-dimensional optical manipulation, three optical elements are required. For scanning in the plane, quasi-static galvoscanners are particularly advantageous, because they expose spatial regions in a defined fashion within a given time period and can thus deposit the necessary light energy quantities, also referred to as light doses. The third dimension can be addressed for example via a z-scanning mirror. These elements can complement optical mirror scanners very well owing to their geometric dimensions.

The present invention can be advantageously used even with the constraint that imaging and manipulation should be performed by the same scanning lens. In this case, only one port is used at the microscope stand.

Particular challenges arise for the above-described objects if the wavelengths for manipulation and imaging are to be identical. For the case that both wavelengths are different, which also has practical relevance, colour splitters can be used.

xy/z-scanning systems are not only very suitable for optical manipulation, but also for imaging scanning any desired trajectories and planes in a three-dimensional specimen. This is advantageous in particular if defined structures within a volume are to be imaged quickly. For example, a neuron that follows an irregular path within a three-dimensional volume can be imaged. If this neuron is intended to be imaged, or the signal transduction, e.g. Ca(2+) waves, along this neuron is intended to be optically measured, very quickly, an optical arrangement according to the invention is capable of tracking this formation occurring within the volume.

The present invention can also be used in a beneficial way in what is called lightsheet microscopy. This is old technology, which was developed by Zsigmondy and Siedentopf 1902/1903 at Carl Zeiss for colloid research. After this method had sunk into oblivion for a long time, new works by E. Stelzer revived it. This renaissance was stimulated by the significant advances in the processing of digital data.

In lightsheet microscopy, at least in the embodiment that is not based on illumination using a cylindrical lens, the object is once again to scan a specimen with a laser beam. A plurality of pupils are of particular advantage even here, because in addition to scanning the beam in two dimensions, dynamic beam shaping should be carried out, see for example Dean et al.: Deconvolution-free subcellular imaging with axially swept light sheet microscopy, Biophysic. J., Vol. 108, 2807-2815 (2015). The optical arrangement according to the invention and the laser scanning microscope according to the invention can be used highly advantageously even here.

The optical arrangement according to the invention can also be used both for linear fluorescence excitation and for non-linear fluorescence excitation, for example for multiphoton microscopy. All customary and known methods are possible with the arrangement (two-photon, three-photon or multiphoton fluorescence; CARS, SRS etc.). In particular the two-photon microscopy is today a standard method for examining living specimens. Specifically, in what is known as neuro imaging, three-dimensional manipulations of the specimen play an important role in the understanding of neurobiological processes in the brain of living animals.

In principle, of only importance for the scanners used is that a beam deflection in the respective coordinate direction is performed with the desired speed and accuracy. With particular preference, the second scanner is a resonance scanner and the third scanner a quasi-static scanner. What is particularly advantageous in this case is that the second scanner, i.e. the fast resonance scanner, is bypassed in the case of the second beam pathway, in other words is no longer effective. That means that the fast second scanner can be switched away very quickly. In principle, the second and the third scanner are interchangeable, i.e. it may also be expedient if the third scanner is a resonance scanner and the second scanner is a quasi-static scanner. Both variants can be advantageous in specific situations.

Both variants permit very fast switching between an imaging mode, in which the fast scanner is used, and an excitation mode, which is performed using the slow quasi-static scanner.

Since it is generally sufficient for an imaging mode if a fast scanner is available for a coordinate direction, it is possible in a further advantageous variant for the first scanner to likewise be a comparatively slow scanner, such as a galvanometric scanner.

However, it is also possible to place a resonant scanner in each of the pupils, wherein the oscillation axes are formed such that the raster-scanned lines in the specimen advantageously, but not necessarily, form an angle of 90°. The field of view cannot be rotated continuously, but adaptation to a specimen geometry is possible within certain limits. However, this mode requires that the optical units, i.e., the concave mirrors, transmit a sufficiently large field.

Finally, the optical arrangement according to the invention also permits the displacement of the region that is raster-scanned by the resonant scanner with the quasi-static scanner in the specimen plane (what is known as "panning"). It is thus possible to jump between different "regions of interest" (ROI).

In the first pupil plane, which is physically closest to the scanning optical unit, in principle a two-dimensional scanner, i.e. a two-dimensional MEMS scanner having a single pivot point, can be arranged.

For the variable beam-deflecting means, which serves for switching between the first beam pathway and the second beam pathway, what is in principle most important is that the desired switching can be performed sufficiently quickly. In preferred variants, the variable beam-deflecting means has a variably positionable mirror. With particular expedience, very lightweight mirrors are used here in order to keep the masses that are to be moved and thus the occurring and necessary forces low.

The variable positionability of the mirror in principle permits manifold technical configurations. In the case of configurations which can be realized with comparatively little outlay, means are present for moving the mirror or panning the mirror into and/or out of the beam pathway.

In further comparatively uncomplicated variants, which are additionally distinguished by mechanically expedient properties, the mirror is a rotating mirror having a rotary device, which, in a first rotational position in which the first beam pathway is selected, is not part of the optical beam path and which, in a second rotational position that differs from the first rotational position in which the second beam pathway is selected, is part of the optical beam path.

Of only importance in principle for the mirror is that the excitation and/or manipulation radiation is reflected with sufficient effectiveness. If different properties are to be achieved for different wavelengths, it may be advantageous if the variable beam-deflecting means has a dielectric and/or dichroic mirror.

A particularly preferred configuration variant of the optical arrangement according to the invention is distinguished in that the variable beam-deflecting means has a wavelength-dependent and polarization-dependent dielectric and/or dichroic mirror, wherein this mirror transmits excitation radiation and/or manipulation radiation having a first wavelength and a first polarization state, reflects excitation radiation and/or manipulation radiation having the first wavelength and a second polarization state that differs from the first polarization state, and transmits fluorescent light, emitted by a specimen, having a red-shifted wavelength independently of the polarization state thereof.

By way of example, the first polarization state can be, with respect to the dielectric and/or dichroic mirror, s-polarization and the second polarization state, with respect to the dielectric and/or dichroic mirror, can be p-polarization.

The arrangement of such a dielectric and/or dichroic mirror in the beam path advantageously enables switching between the first beam pathway and the second beam pathway of the excitation radiation and/or of the manipulation radiation by switching between s-polarization and p-polarization. In addition, suitable switching means for switching the polarization, for example a half-wave plate, can be present in the laser scanning microscope according to the invention.

In principle, of importance when switching the beam pathways, is that the second beam-deflecting device, i.e., the second scanner, is bypassed. This can be realized in a space-saving manner and in a small installation space in the case of configuration variants in which a fourth pupil plane, which is optically conjugate to the first pupil plane and the third pupil plane and in which a further beam-deflecting and/or beam-shaping component is arranged, is formed in the second beam pathway.

This further beam-deflecting and/or beam-shaping component can be, for example, a fixed, mirror.

A further pupil plane also permits intervention in the wavefront of the excitation radiation and/or the manipulation radiation. It may be advantageous in this aspect if the further beam-deflecting component is a mirror, whose surface can be actively curved, or a segmented mirror or another device for manipulating the wavefront.

By way of example, the wavefront can be manipulated using elements of the type described in J. Biomed. Opt. 21(12), 121507, Oct. 12, 2016, see FIG. 2 therein, such that refocusing in the specimen is achieved at high speed.

Wavefront-changing elements of this type are generally introduced into the beam path using comparatively complicated relay optical units. For systems, in which the intention is also to perform confocal measurements, these relay optical units result in a significant and frequently unacceptable light loss, and they are moreover expensive and difficult to adjust. Irrespective of this, fast switching of the beam pathway between manipulation and imaging in the type described above is hardly possible using relay optical units.

The optical arrangement according to the invention also affords significant improvements in this respect. A further mode, which supports three-dimensional manipulation, as is used for example in optogenetics, can be made available by the arrangement according to the invention by introducing a fast wavefront-shaping element in the fourth pupil plane. Such elements are offered, for example, by Revibro Optics (Bozeman, Mont. 59717). Alternative components which provide a desired function, but which require an optical pupil for it, are of course also possible here. It is possible using the quickly adjustable z-scanning element in combination with the quasi-static scanners to perform optical manipulation in a three-dimensional volume.

Moreover, a control and evaluation unit can be present, which controls the components of the optical arrangement according to the invention, for example the variable beam-deflecting device, a device for switching the polarization and/or a device for manipulating the wavefront, such as a segmented mirror or a mirror whose surface can be actively curved. A control and evaluation unit of this type can be, for example, a PC.

Advantageous configurations of the laser scanning microscope according to the invention, include a device for multi-point illumination with a plurality of illumination channels.

For example, the device for multipoint illumination can have a multichannel AOTF for controlling the individual illumination channels. It is thus possible to set the individual illumination channels as desired with respect to wavelength and intensity of the radiation.

In a preferred variant, one of the illumination channels is used for excitation and/or manipulation of a specimen, and the further illumination channels are used for imaging.

To this end, variants of the laser scanning microscope according to the invention, in which for at least one of the illumination channels a device for manipulation of the polarization, such as a half-wave plate, is present, are particularly preferred. It is possible with this device for manipulating, i.e. for switching, the polarization to switch the beam path for at least one illumination channel between the first beam pathway and the second beam pathway.

A further advantage of the present invention is additionally that it can be used in various microscopy techniques.

For example, the laser scanning microscope according to the invention can be set up for providing contrast on the basis of at least one non-linear contrast principle. The non-linear contrast principle can be multiphoton fluorescence, for example two-photon or three-photon fluorescence, CARS (coherent anti-Stokes Raman scattering) or SRS (stimulated Raman scattering). The microscope according to the invention is with particular preference a two-photon laser scanning microscope.

With particular preference, the microscope according to the invention can also be a confocal microscope, in particular a confocal laser scanning fluorescence microscope. A microscope is referred to as confocal if a pinhole is present in a plane that is conjugate to the image plane.

Owing to the concentration of the excitation volume due to the non-linearity of the multiphoton fluorescence, such a confocal stop is not necessarily required in a multiphoton scanning microscope or multiphoton fluorescence scanning microscope.

BRIEF DESCRIPTION OF THE DRAWINGS

Further advantages and features of the invention will be explained below with reference to the schematic figures, in which.

DESCRIPTION OF THE EMBODIMENTS

Identical components and those having equal function are generally denoted with the same reference signs in all figures.

What will be considered below, by way of example, is the case in which quasi-static scanners are used to perform a spatially targeted manipulation in a specimen. Afterwards, very fast switching to imaging is to be performed. The basis of this is the desire to record images at what is known as video rate. In laser scanning microscopes, this is possible, for example, using what are known as resonance scanners. It is furthermore assumed for the following example in FIG. 1 that both the optical manipulation and the excitation of the fluorescence for the imaging is realized with a laser line at 488 nm, since this is a frequently occurring application case.

Figure 1:
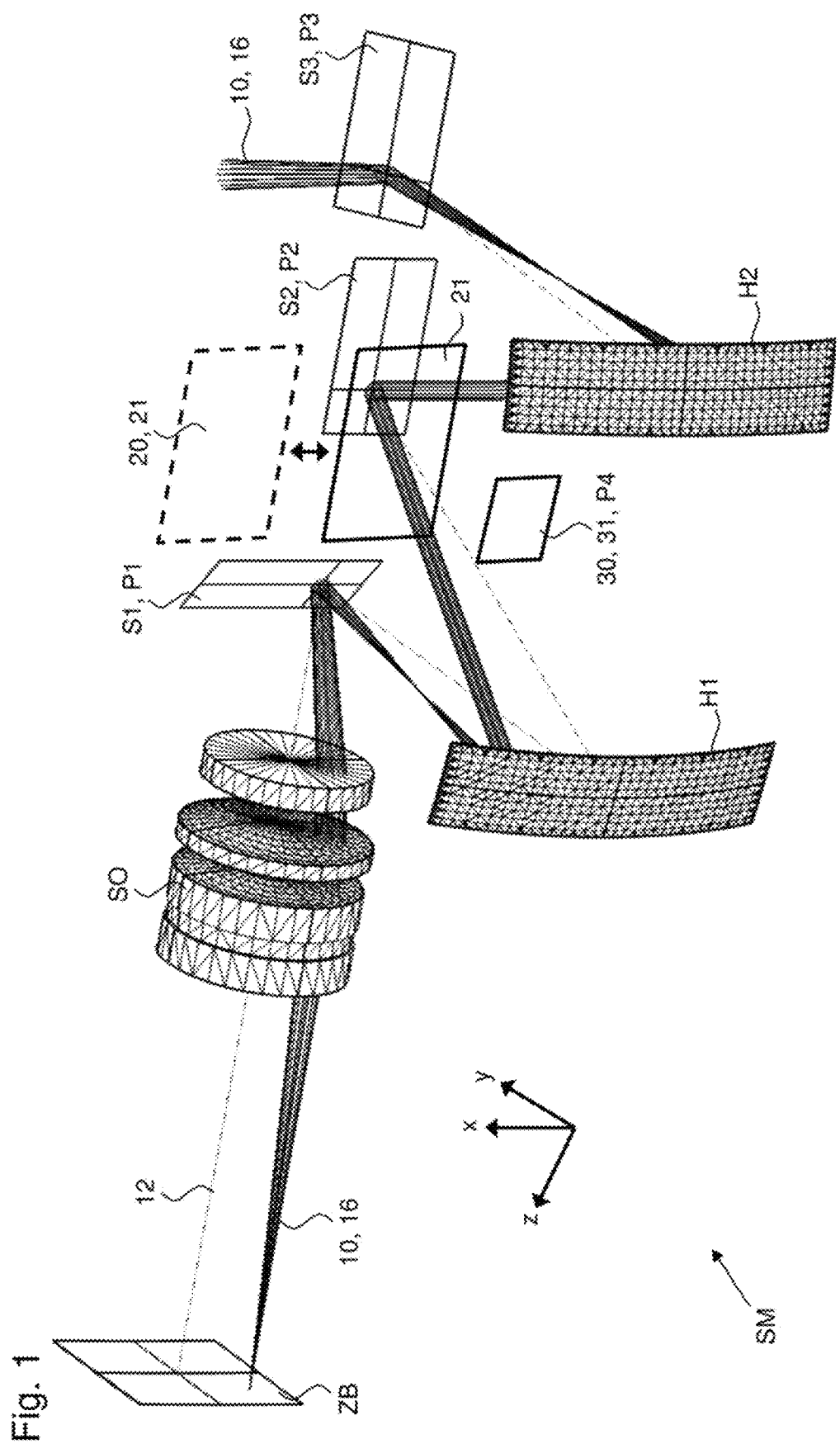
FIG. 1: shows a first exemplary embodiment of an optical arrangement according to the invention.

The problem is solved by way of an optical arrangement SM according to the invention for scanning excitation radiation and/or manipulation radiation in a laser scanning microscope, specifically a laser scanning fluorescence microscope, as is illustrated in FIG. 1. Here, three scanners S1, S2 and S3 are arranged in series one behind the other, wherein imaging of all scanners onto one another results in all scanners being situated in an optical pupil. This is an essential point, because it ensures that the pupil remains stationary and a field of view is recorded homogeneously.

The optical arrangement SM has, as an essential component, firstly a scanning optical unit SO for providing a first pupil plane P1. In an operating state, i.e. a state in which the optical arrangement SM interacts with a laser scanning microscope or is installed in this microscope, this first pupil plane P1 is optically conjugate to a rear objective pupil of the microscope objective. Arranged in said first pupil plane P1 is a first scanner S1 as a first beam-deflecting device, which serves for scanning excitation radiation and/or manipulation radiation 10 in a first coordinate direction y. The scanner S1 can be, for example, a quasi-static galvanometric scanner. The schematically illustrated scanner mirror S1 is here panned during operation about an axis that is located vertically in FIG. 1.

Next, a first focusing device is present, which in the example shown is a first concave mirror H1. This first concave mirror H1 serves for providing a second pupil plane P2, which is optically conjugate to the first pupil plane P1. Arranged in the second pupil plane P2 is, as a second beam-deflecting device, a second scanner S2 which serves for scanning the excitation radiation and/or manipulation radiation in a second coordinate direction x that differs from the first coordinate direction y. The xyz-coordinate system that is schematically illustrated in FIG. 1 is a Cartesian coordinate system, i.e. the first coordinate direction y is perpendicular to the second coordinate direction x. The direction of the optical axis 12 extends in the region between the intermediate image plane ZB and the scanning optical unit SO parallel with respect to the z-axis. The second scanner S2 can be, for example, a resonance scanner. The scanner mirror S2 illustrated schematically in FIG. 1 is panned, during operation, about an axis which is oriented parallel with respect to the z-direction.

Furthermore present is a second focusing device, which in the example shown is a second concave mirror H2. The second concave mirror H2 serves for producing a third pupil plane P3, which is optically conjugate to the first pupil plane P1 and the second pupil plane P2. Arranged in said third pupil plane P3 is, as a third beam-deflecting device, a third scanner S3 which serves for scanning the excitation radiation and/or manipulation radiation 10 in the second coordinate direction x. The third scanner S3 can, like the first scanner S1, be a quasi-static galvanometric scanner.

According to the invention, a variable beam-deflecting means 20 is present for switching the optical beam path between a first beam pathway and a second beam pathway between the first concave mirror H1 and the second pupil plane P2, on the one hand, and the second pupil plane P2 and the second concave mirror H2, on the other. In the example illustrated in FIG. 1, the variable beam-deflecting means 20 is a mirror 21, which can be moved into or out of the beam path. To this end, suitable mechanical means are present, which are not illustrated in detail in FIG. 1.

According to the invention, the first beam pathway extends from the third scanner S3 by the second concave mirror H2, the second scanner S2 and the first concave mirror H1, to the first scanner S1. The second beam pathway extends according to the invention from the third scanner S3, via the second concave mirror H2 while bypassing the second scanner S2 via the mirror 21, by way of which the variable beam-deflecting means 20 is realized and which, if the second beam pathway is selected, is located in the beam path, and the first concave mirror H1, to the first scanner S1. The second pupil plane P2, in which the second scanner S2 is located, is imaged onto a fourth pupil plane P4 by the mirror 21 which has been moved into the beam path. Positioned in said fourth pupil plane P4 is a further beam-deflecting device 30, which in the example shown in FIG. 1 is a fixed mirror 31.

In principle, it is also possible for an optical element for fast refocusing, as is offered e.g. commercially by Revibro Optics (Bozeman, Mont. 59717), to be arranged in the fourth pupil plane P4 instead of the fixed mirror 31.

What is essential is that the beam pathway via the second scanner S2, and thus the effect of said second scanner S2, is deactivated or switched off due to the actuation of the variable beam-deflecting means, i.e. by moving the mirror 21 into the beam path. In other words, switching is performed between the two-dimensional scans with and without resonance scanner.

Figure 5:
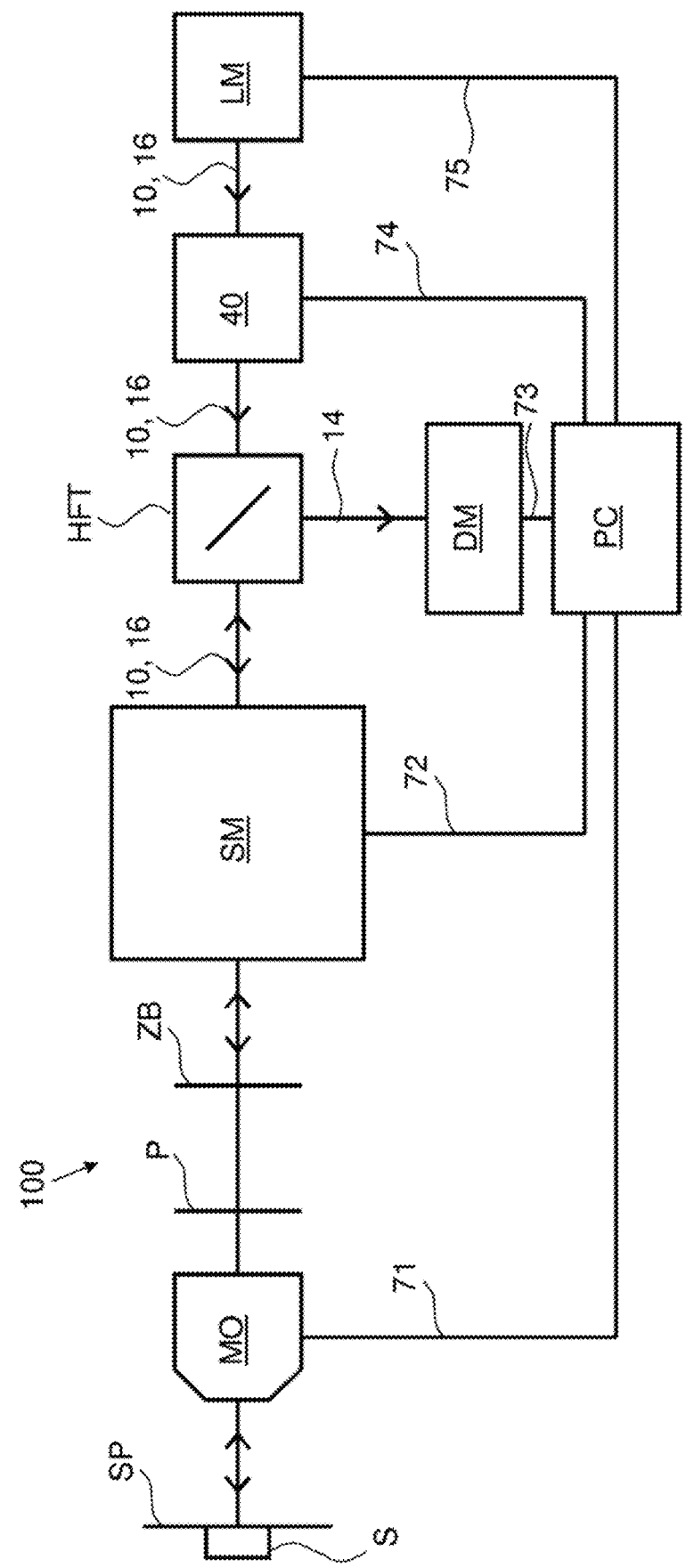
FIG. 5 shows a schematic illustration of a laser scanning microscope according to the invention.

The setup of a laser scanning microscope according to the invention will be explained with respect to FIG. 5. The laser scanning microscope 100 which is illustrated schematically here has, as important components, a laser module LM, a main colour splitter HFT, an optical arrangement SM according to the invention for scanning excitation and manipulation light 10, a microscope objective MO and a detection module DM. The laser module LM serves as the radiation source for excitation light 16 and manipulation light 10. In the example illustrated schematically in FIG. 5, the excitation light 16 or manipulation light 10 emitted by the laser module LM is incident on a multipoint module 40, which separates the incoming light beam into a plurality of beam bundles, which are subsequently focused into different focal volumes on or in a specimen S. The spectral composition and the intensity can be set separately for the individual partial beams, for example using a multichannel AOTF. The laser module LM, the multipoint module 40, the optical arrangement for scanning SM according to the invention, an objective revolving turret (not illustrated) and the detection module DM are connected, via connection lines 71 to 75, to a control and evaluation unit PC, which can be a commercially available computer.

After the excitation light 16 or manipulation light 10 has passed through the multipoint module 40, it reaches, via the main colour splitter HFT, the optical arrangement SM according to the invention for scanning the excitation light 16 and/or manipulation light 10. The scanning optical unit SO of the optical arrangement SM focuses the excitation light 16 or manipulation light 10 into an intermediate image plane ZB. The excitation light 16 or manipulation light 10 reaches, by way of further components, for example mirrors which are not illustrated in FIG. 5, via a rear objective pupil P into the microscope objective MO, which focuses the light into a plurality of focal volumes on or in the specimen S, which is located in a specimen plane SP. The number of separate focal volumes corresponds to the number of separate beam bundles generated in the multipoint module 40. If the multipoint module 40 were to be omitted, the excitation or manipulation light would be focused in one focal point. Using the optical arrangement SM according to the invention for scanning, the focal volumes of the excitation or manipulation light 10 are scanned in the intermediate image plane ZB and thus in the specimen plane SP which is optically conjugate to the intermediate image plane ZB.

First, the beam profile for manipulation light 10 will be explained, with which for example a defined manipulation, for example defined bleaching along a specific trajectory, is effected in a specimen. If this bleaching is performed, it is possible, as will be explained below, to quickly switch the optical arrangement SM according to the invention and to observe the specimen in an imaging mode using excitation light 16. The manipulation light 10 first reaches the third scanner S3 in the third pupil plane P3. In the exemplary embodiment illustrated in FIG. 1, the third scanner S3 is a quasi-static galvanometric scanner, which comparatively slowly scans the manipulation light 10 in the x-direction. For the manipulation light 10, in the optical arrangement for scanning SM according to the invention, the second beam pathway is activated, i.e. the mirror 21, as a variable beam-deflecting means 20, is located in the beam path and the second scanner S2 in the second pupil P2 is deactivated. The manipulation light 10 accordingly passes, from the third scanner S3, via the second concave mirror H2, the variable mirror 21, the fixed mirror 31 in the fourth pupil plane P4 and the first concave mirror H1, to the first scanner S1 in the first pupil plane P1. The first scanner S1 is likewise a quasi-static galvanometric scanner, which comparatively slowly scans the manipulation light 10 in the y-direction. With suitable actuation of the second scanner S2 and of the third scanner S3, the desired manipulation in the specimen, for example bleaching along a specific trajectory, can be performed. Instead of the fixed mirror 31 in the fourth pupil P4, it is also possible for example for a mirror whose surface can be actively curved to be positioned there, with which scanning in the z-direction can be performed by varying the focusing. Such a mirror is generally initially flat and can then be deformed, for example into a concave mirror. It is thus possible in principle to also manipulate three-dimensional trajectories or freely selected volumes in a specimen using the manipulation light 10.

After manipulation is complete, it may be desired for the optical arrangement SM to be quickly switched into an imaging mode. To this end, the displaceable mirror 21 is removed from the beam path, i.e. pulled up in the example shown in FIG. 1. The excitation light 16, coming from the main colour splitter HFT, is now likewise initially incident on the third scanner S3 in the third pupil plane P3. From the third scanner S3, the excitation light 16 now passes, via the second concave mirror H2, onto the second scanner S2 in the second pupil plane P2, which scans the excitation light 16 in the x-direction. In the example shown in FIG. 1, the second scanner S2 is a resonance scanner, i.e. a scanner which is much faster as compared to the first scanner S1 and the third scanner S3. Since the third scanner S3 is a quasi-static scanner, it can in principle be brought to a standstill very quickly, or the scanning of the excitation light 16 in the x-direction is performed in combination both by the third scanner S3 and by the second scanner S2. By way of example, it is possible using the quasi-static scanners S1 and S3 to set the site of a specific field of view, and the quick scanning is then performed with the second scanner S2. From the second scanner S2, the excitation light 16 subsequently passes to the first concave mirror H1, and from here onto the first scanner S1. After the first concave mirror H1, the beam profile is then the same as that for the manipulation light 10, which was described above.

The pupils P2 and P4 can have different optically active or passive elements. In the simplest case, this is in each case a mirror, if an active element which is to be bypassed is located in the respectively other pupil. For example, a resonant scanner can be, located in P2, as described. If said scanner is not used, no light should be guided over it so as to avoid disruptions of the beam by residual movements. In addition, a resonant scanner has a specific transient behaviour. If the desire is to realize very fast switching between a manipulation mode and a fast imaging mode using a resonant scanner, the scanner must continue to oscillate, and in the corresponding moment, this movement is optically switched on.

There are important applications of fast imaging using resonant scanners that require the scanning field of the resonant scanner to be moved laterally over the specimen (what is known as "panning"). The optical arrangement according to the invention does this, because the fast second scanner S2 and the quasi-static third scanner S3 can be used at the same time. This is not possible in this way using the arrangement from DE 10 2014 017 001 A1.

At the second concave mirror H2, the angle between the incident and reflected beam is preferably identical to the corresponding angle at the first concave mirror H1, and the rotational axes of the second scanner S2 and of the third scanner S3 are preferably parallel with respect to one another. As a result, no asymmetric scanning distortions during sampling in the specimen plane occur irrespective of whether scanning is performed using the second scanner S2 or the third scanner S3 or both (see in this respect DE 10 2014 017 001 A1).

After excitation of the specimen S by way of the excitation light 10, the specimen S emits, in a manner known in principle, detection light 14, which substantially travels along the same optical beam path back to the main colour splitter HFT. The mirror 21 must here remain removed from the beam path. The detection light 14 is typically fluorescence light, the wavelength of which is red-shifted due to Stokes shift as compared to the wavelength of the excitation light 10. This red shift permits the separation of the detection light 14 in the main colour splitter HFT, and the detection light 14 passes, possibly via further components (not illustrated) such as mirrors or filters, to the detection module DM and is here quantitatively detected. The measurement data of the detection module DM are supplied to the control and evaluation unit PC.

The optical arrangement according to the invention, as is illustrated in FIG. 1, can be extended in a beneficial manner in various respects.

Figure 2:
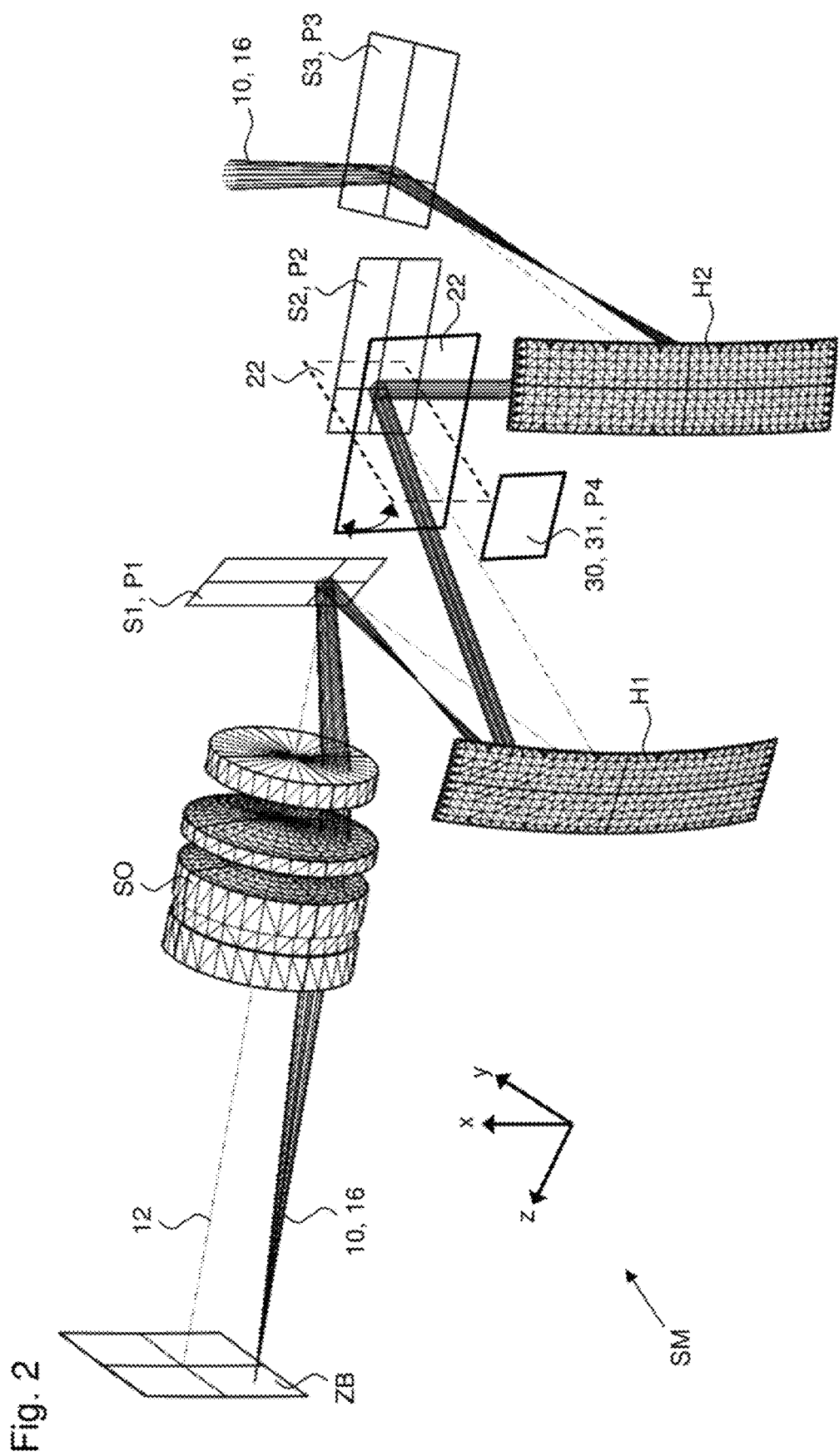
FIG. 2 shows a second exemplary embodiment of an optical arrangement according to the invention.

The exemplary embodiment illustrated in FIG. 2 largely corresponds to that from FIG. 1. The differences are in the variable beam-deflecting means 20. In the exemplary embodiment shown in FIG. 2, this variable beam-deflecting means 20 is a rotating mirror 22 having a mechanical rotation device which is not illustrated in FIG. 2. The rotation device can be realized e.g. by way of a galvanometric scanner. This is advantageous because the moment of mass inertia can be kept relatively small.

The rotating mirror 22 in FIG. 2 can be pivoted between a first position, which largely corresponds to the mirror 21 in FIG. 1 which has been moved into the beam path, and a second position, in which the rotating mirror 22 is aligned substantially perpendicularly with respect to the panning axis of the second scanner S2. What is essential is that the rotating mirror 22 in the second position does not intervene in the beam path, in other words that excitation light 16 coming from the concave mirror H2 passes, without being obstructed by the rotating mirror 22, to the second scanner S2 and from here to the first concave mirror H1. The same applies to detection light 14, which then passes along the beam path in the opposite direction.

A further essential advantage of the optical arrangement according to the invention is thus that it is possible to switch very quickly between what is known as a manipulation mode and a fast imaging mode. This can be done in various ways.

If the excitation light and manipulation light is spectrally different, first a colour filter, e.g. a dichroic mirror, can be introduced at the position of the displaceable mirror 21 in FIG. 1. This mirror is a variable beam-deflecting means to the extent that its reflection and transmission properties depend on the wavelength of the radiation. It should be taken into consideration here that the properties of a dichroic mirror are dependent on the angle of the radiation that is incident thereon, which can under certain circumstances lead to a limitation of the field of view.

In the case of the same wavelength of the manipulation radiation and the fluorescence excitation radiation, in the simplest case, as is shown in FIG. 1, a reflective element (displaceable mirror 21) is pivoted into the beam or inserted therein. However, this involves moving a mirror having a specific mass. It is generally difficult, using such an arrangement, to become faster than 10 ms or, even better, faster than 1 ms. Owing to its relatively low mass inertia, a rotating mirror 22, as is shown in FIG. 2, is better in this regard. However, switching that is not based on mechanical switching elements is desirable.

It is also possible using the optical arrangement, as shown in FIG. 1, to perform non-mechanical switching between the pupils. This principle will be explained in connection with FIG. 3.

Figure 3:
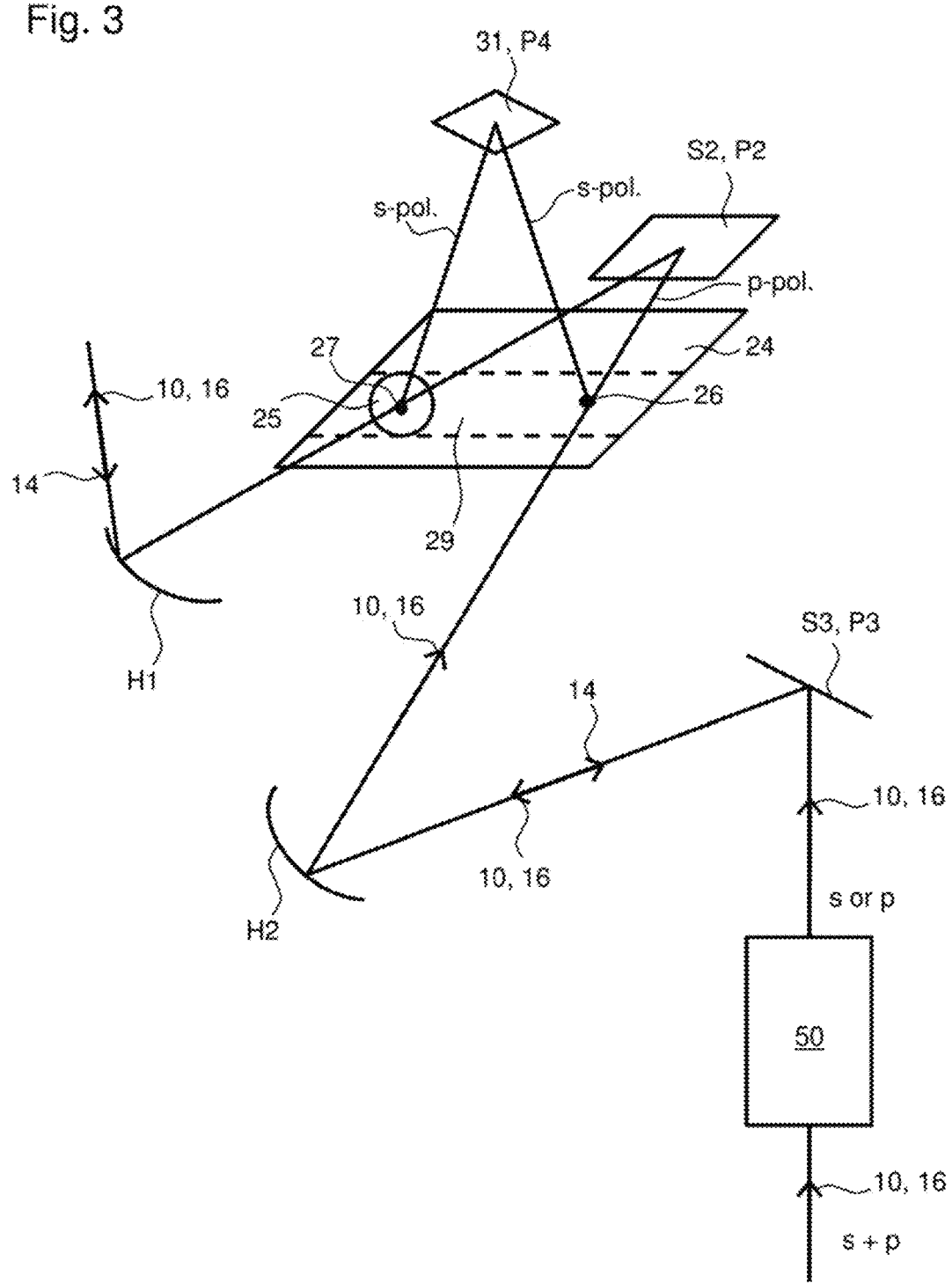
FIG. 3 shows a detail of a third exemplary embodiment of an optical arrangement according to the invention.

Using the arrangement from FIG. 3, which is also referred to as a beam switch, it is possible to switch between the pupils P2 and P4. Located in the pupil P2 is now, for example, a resonance scanner. Pupil P4 can have, for example, a fixed mirror. If the beam pathway is selected such that P4 is addressed, manipulation or imaging can be performed using the quasi-static scanner, wherein the resonant scanner is bypassed. Alternatively, it is also advantageous to place optically active elements in P4. For example, a wavefront-modulating element can be placed here, which can very quickly set a defocus.

Illustrated in FIG. 3 is an optical beam switch of this type. It is used to switch between the pupils P2 and P4. Various optical elements can be used for this switching. First, it is possible, as explained, for a switching mirror to switch between P2 and P4 within a few milliseconds. If even faster switching times are required, alternative switching mechanisms must be used. If the intention is to use the same wavelength in both pupils for manipulation and fast imaging, a polarization-dependent element can be used.

The element exhibits wavelength-dependent reflection such that, for shorter wavelengths, polarization-dependent splitting occurs, while both polarization components of the emission are transmitted very well.

This will be explained in more detail in connection with FIGS. 3 and 4. FIG. 3 schematically illustrates a few essential details of an optical arrangement for scanning of excitation light 16 and manipulation light 10 according to the invention. In this configuration variant, switching between the first beam pathway and the second beam pathway is performed by changing the polarization of the excitation light 16 or of the manipulation light 10. Instead of the mirrors 21, 22 which are to be positioned variably in the beam path in the exemplary embodiments of FIGS. 1 and 2, in the exemplary embodiment of FIG. 3, a dielectric mirror 24 is located in the beam path between the second scanner S2 in the second pupil plane P2, on the one hand, and the first concave mirror H1 and the second concave mirror H2, on the other. Additionally illustrated schematically is, upstream of the third scanner S3 in the third pupil plane P3, a polarization rotation device 50. This can be an electro-optical polarizer or, for example, a half-wave plate, which can be mechanically moved into and out of the beam path. The dielectric mirror 24 is constructed in a targeted fashion with respect to the wavelengths used of the excitation light 16, of the manipulation light 10 and of the typically expected detection light 14, and has the following dichroic properties, which will be explained in connection with FIG. 4.

Figure 4:
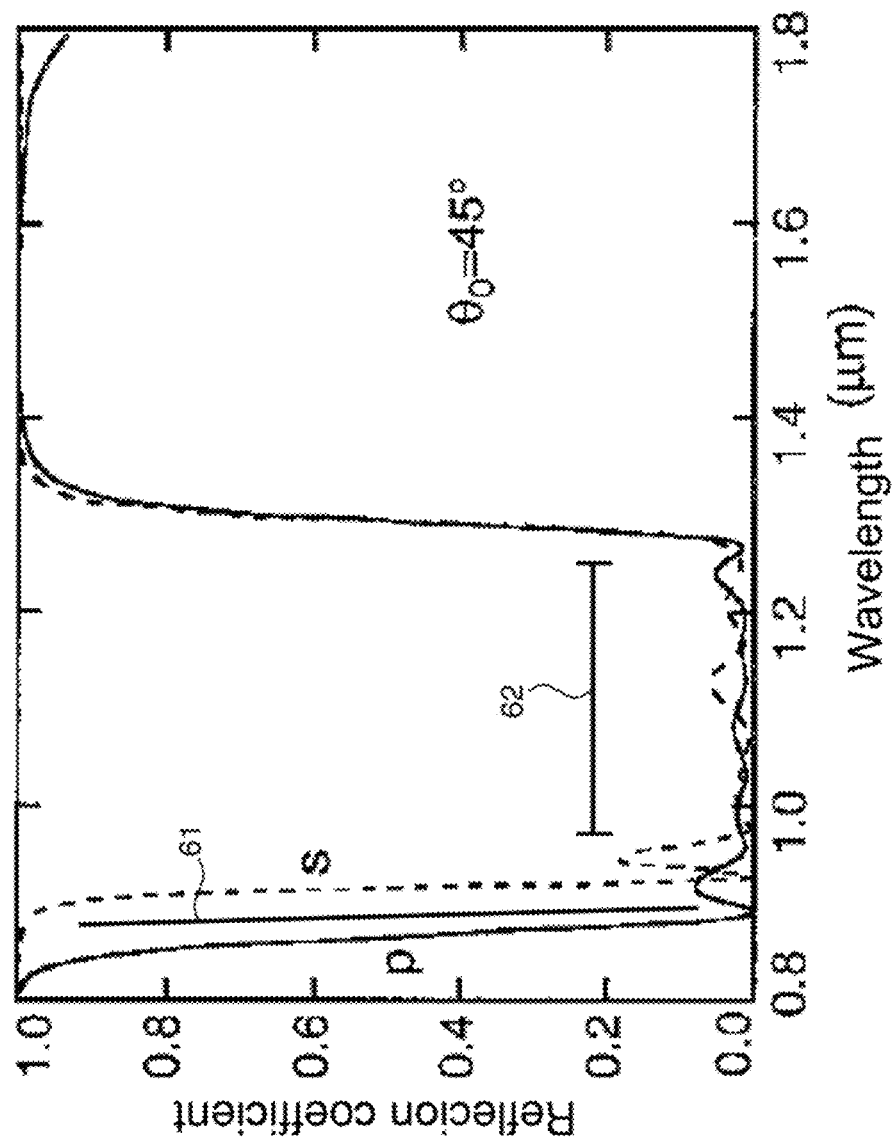
FIG. 4 shows a diagram in which is plotted the reflection coefficient over the wavelength in dependence on the polarization for a specific dielectric and/or dichroic mirror.

FIG. 4 shows a diagram, in which the reflection coefficient of the dielectric mirror 24 is plotted over the wavelength of the incident light. The data relates to an angle of incidence of the light on the mirror 24 of 45°. The dashed curve refers to the s-polarization, and the solid curve refers to the p-polarization. As can be seen from FIG. 4, at a value of the wavelength which is designated with the reference sign 61, the reflection coefficient at s-polarization is nearly 1 and at the same time the reflection coefficient at p-polarization is nearly 0.

The orientation within the spectral reflection profile ensures that, in the manipulation/excitation wavelength, either high reflection (s-polarized component) or high transmission (p-polarized component) is achieved.

At this wavelength 61, s-polarized light is thus nearly completely reflected and p-polarized light is nearly completely transmitted. That means that, by switching the polarization, switching between reflection and transmission can be performed.

The fluorescence emission is denoted, by way of example, by the region 62. Here, both polarization components are transmitted highly efficiently.

These properties are utilized in the exemplary embodiment in FIG. 3.

Using the polarization rotation device 50, it is possible for the light that is incident on the third scanner S3 to set the polarization between two mutually perpendicular values. The polarization rotation device 50 is here set such that, with respect to the dielectric mirror 24, either s-polarization or p-polarization can be set.

For the case that operation is to take place in a manipulation mode, i.e. that the specimen is to be impinged by manipulation light 10, the polarization rotation device 50 is expediently used to set s-polarization. The manipulation light 10 then passes, via the third scanner S3 and the second concave mirror H2, to the dielectric mirror 24. Owing to the set s-polarization, the manipulation light 10 at the point of incidence 26 is reflected at the dielectric mirror 24 and is guided in the direction of the further beam-deflecting component 30 in the fourth pupil plane P4. The further beam-deflecting component 30 is in the example shown a fixed mirror 31. In principle, it is also possible to arrange in the fourth pupil plane P4 a mirror whose surface can be actively curved or a wavefront-modulating component. The manipulation light 10 reflected by the fixed mirror 31 is reflected again at the point of incidence 27 at the dielectric mirror 24 and is guided in the direction of the concave mirror H1 and, from here, in principle as in FIGS. 1 and 2, to the first scanner S1. The second fast scanner S2 is here deactivated.

If the incident light is excitation light 16, the polarization of the excitation light 16 is set to p-polarization using the polarization rotation device 50. This has the result that the p-polarized excitation light 16 passes through the dielectric mirror 24 at the point 26 and onto the second fast scanner S2 in the second pupil plane P2. Accordingly, the excitation light 16 that is reflected by the second scanner S2 passes at the point 27 through the dielectric mirror 24 and onto the first concave mirror H1 and to the first scanner S1, which is not illustrated in FIG. 3. A region in which the passage points of the beam of the excitation light 16 move is schematically illustrated in FIG. 3 and designated with the reference sign 25.

For detection light 14, which is emitted by the specimen S and passes along the optical beam path in the reverse direction, the above observation does not apply due to the red-shifted wavelength. It is clear from FIG. 4 that the reflection coefficient is very low both for s-polarization and for p-polarization within a wavelength interval that is designated with the reference sign 62. That means that light in this wavelength range 62 is transmitted very well by the dielectric mirror 24, independently of its polarization. The dielectric mirror 24 is here produced in targeted fashion such that typical wavelengths of the detection light 14 are exactly within the interval 62. The result of the exemplary embodiment shown in FIG. 3 is thus that here, switching can be performed between the first beam pathway, which extends over the second scanner S2, and the second beam pathway, which extends over the fixed mirror 31 while bypassing the second scanner S2, by way of suitable setting of the polarization of the excitation light 16 or of the manipulation light 10.

Rotation of the polarization is possible at very high speed. Electro-optical modulators permit polarization rotation up into the MHz range. Switching between the pupils is thus effected in the range of microseconds. The emitted fluorescent light, which emanates from the specimen, has a characteristic Stokes shift, which depends on the fluorophore under observation. As a result, this radiation has a longer wavelength, which in the observed spectral reflection characteristic has the result that the element in this range transmits both polarization components with high efficiency. One technical problem here is that the behaviour of these layers is strongly angle-dependent. For an angle variation of approximately 10°, such a layer can be produced, however. For this reason, the layer in FIG. 3, having the spectral reflection property as in FIG. 4, is designed only as a narrow strip 29. Alternatively, a plurality of strips having a characteristic which is respectively adapted to a specific angle range or even graduated-filter-type elements can be produced and integrated.

Highly advantageously, this switching mechanism is combined with active multipoint illumination, as is described for example in DE 10 2016 102 286.1. Here, one of the multiple beams can have, for example, a polarization which is rotated about 90°. This is then the manipulation beam, which generally also has a higher intensity. All remaining beams are used for imaging. Switching using the acousto-optical filter (AOTF) now results in the desired switching of the illumination beam pathways for the manipulation by the pupil P4 or the detection via the scanners S2 in the pupil P2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS x second coordinate direction
y first coordinate direction
z direction of the optical axis
DM detection module
HFT main colour splitter
H1 first focusing device, first concave mirror
H2 second focusing device, second concave mirror
LM laser module/light source
MO microscope objective
P pupil plane of the microscope objective MO
PC control and evaluation unit
P1 first pupil plane
P2 second pupil plane
P3 third pupil plane
P4 fourth pupil plane
S specimen
SM scanning module, optical arrangement according to the invention
SO scanning optical unit
SP specimen plane
S1 first scanner
S2 second scanner
S3 third scanner
ZB intermediate image plane
10 manipulation radiation, manipulation light
12 optical axis
14 detection light
16 excitation radiation, excitation light
20 variable beam-deflecting means
21 displaceable mirror
22 rotating mirror
24 dielectric mirror
25 region in which the passage points of the beam move during scanning
26 point of incidence, point of passage
27 point of incidence, point of passage
30 further beam-deflecting and/or beam-shaping components
31 fixed mirror
40 multipoint module
50 polarization rotation device
61 wavelength at which the reflection coefficient is dependent maximally on polarization
62 wavelength range in which the reflection coefficient is nearly independent of polarization
71-75 lines from microscope components to the PC
100 laser scanning microscope

What is claimed is:

1. Optical arrangement for scanning at least one of excitation radiation and manipulation radiation in a laser scanning microscope, comprising:
a scanning optical unit for providing a first pupil plane;
a first beam-deflecting device, formed by a first scanner arranged in the first pupil plane, for scanning the excitation radiation and manipulation radiation in a first coordinate direction;
a first focusing device for producing a second pupil plane, which is optically conjugate to the first pupil plane;
a second beam-deflecting device for deflecting at least one of the excitation radiation and manipulation radiation, which is arranged in the second pupil plane;
a second focusing device for producing a third pupil plane, optically conjugate to the first pupil plane and the second pupil plane;
a third beam-deflecting device arranged in the third pupil plane for deflecting at least one of the excitation radiation and manipulation radiation; and
a variable beam-deflecting means for switching an optical beam path between a first beam pathway and a second beam pathway positioned between the first focusing device and the second pupil plane, and the second pupil plane and the second focusing device, and
wherein the first beam pathway extends at least from the third beam-deflecting device via the second beam-deflecting device to the first scanner and
wherein the second beam pathway extends at least from the third beam-deflecting device to the first scanner while bypassing the second beam-deflecting device via the variable beam-deflecting means; and
wherein the third beam-deflecting device in the third pupil plane is a third scanner for scanning at least one of the excitation radiation and the manipulation radiation in a second coordinate direction that differs from the first coordinate direction.

2. Optical arrangement according to claim 1 for use in a laser scanning fluorescence microscope.

3. Optical arrangement according to claim 1, wherein the first beam pathway extends at least from the third beam-deflecting device via the second focusing device, the second beam-deflecting device and the first focusing device to the first scanner and wherein the second beam pathway extends at least from the third beam-deflecting device via the second focusing device to the first scanner while bypassing the second beam-deflecting device via the variable beam-deflecting means and the first focusing device.

4. Optical arrangement according claim 1, wherein at least one of the first focusing device and the second focusing device is one of a concave mirror, a toric concave mirror and a spherical concave mirror.

5. Optical arrangement according to claim 1, wherein the second beam-deflecting device in the second pupil plane is a second scanner for scanning at least one of the excitation radiation and the manipulation radiation in a second coordinate direction that differs from the first coordinate direction.

6. Optical arrangement according to claim 5, wherein the second scanner is a resonance scanner and a third scanner is a quasi-static scanner.

7. Optical arrangement according to claim 5, wherein the third scanner is a resonance scanner and a second scanner is a quasi-static scanner.

8. Optical arrangement according to claim 1, wherein at least one of the second beam-deflecting device and the third beam-deflecting device is one of a fixed mirror, a mirror whose surface can be actively curved, and a different wavefront-changing element.

9. Optical arrangement according to claim 1, wherein the first scanner is a galvanometric scanner.

10. Optical arrangement according to claim 1, wherein the variable beam-deflecting means has a variably positionable mirror.

11. Optical arrangement according to claim 10, wherein means are present for moving the mirror and for pivoting the mirror into and out of the beam path.

12. Optical arrangement according to claim 10, wherein the mirror is a rotating mirror having a rotation device which, in a first rotational position in which the first beam pathway is selected, is not part of the optical beam path and which, in a second rotational position which differs from the first rotational position and in which the second beam pathway is selected, is part of the optical beam path.

13. Optical arrangement according to claim 1, wherein the variable beam-deflecting means has a dielectric mirror.

14. Optical arrangement according to claim 1, wherein the variable beam-deflecting means has a wavelength-dependent and polarization-dependent dichroic mirror, wherein said dichroic mirror:
   transmits at least one of the excitation radiation and manipulation radiation having a first wavelength and a first polarization state;
   reflects at least one of the excitation radiation and manipulation radiation having the first wavelength and a second polarization state that differs from the first polarization state; and
   transmits fluorescent light emitted by a specimen having a red-shifted wavelength independently of the polarization state thereof.

15. Optical arrangement according to claim 14, wherein the first polarization state with respect to the dichroic mirror is s-polarization and in that the second polarization state with respect to the dielectric mirror is p-polarization.

16. Optical arrangement according to claim 1, wherein formed in the second beam pathway is a fourth pupil plane, which is optically conjugate to the first pupil plane and the third pupil plane and in which a further component which is at least one of beam-deflecting and beam-shaping is arranged.

17. Optical arrangement according to claim 16, wherein the further component is a mirror.

18. Optical arrangement according to claim 16, wherein the further component is one of a mirror whose surface can be actively curved, a segmented mirror and a device for manipulating the wavefront.

19. Laser scanning microscope, comprising
   at least one laser light source for emitting laser radiation for at least one of exciting and manipulating a specimen;
   at least one main colour splitter for splitting at least one of excitation radiation and manipulation radiation and wavelength-shifted detection light emanating from a specimen,
   at least one microscope objective for guiding at least one of the excitation radiation and manipulation radiation onto a specimen and for guiding detection light emanating from the specimen back in the direction of the main colour splitter;
   a detection module for detecting the detection light; and
   an optical arrangement for scanning at least one of the excitation radiation and manipulation radiation according to claim 1.

20. Laser scanning microscope according to claim 19, further comprising a device for multipoint illumination having a plurality of illumination channels.

21. Laser scanning microscope according to claim 20, further comprising a device for manipulating the polarization for at least one of the illumination channels.

22. Laser scanning microscope according to claim 19, wherein the device for multipoint illumination has a multi-channel AOTF for controlling the individual illumination channels.

23. Laser scanning microscope according to claim 19, configured for providing contrast on the basis of at least one the following non-linear contrast principles multiphoton fluorescence, two-photon fluorescence, three-photon fluorescence, CARS, and SRS.

24. Laser scanning microscope according to claim 19, which is one of a confocal microscope and a confocal laser scanning fluorescence microscope.

* * * * *